United States Patent
Tanase et al.

(10) Patent No.: US 10,925,262 B2
(45) Date of Patent: Feb. 23, 2021

(54) ILLUMINATION SYSTEM AND METHOD FOR ENHANCING GROWTH OF AQUATIC ANIMALS

(71) Applicant: SIGNIFY HOLDING B.V., Eindhoven (NL)

(72) Inventors: Cristina Tanase, Eindhoven (NL); Rainier Franciscus Xaverius Alphonsus Marie Mols, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 359 days.

(21) Appl. No.: 14/653,342

(22) PCT Filed: Dec. 4, 2013

(86) PCT No.: PCT/IB2013/060618
§ 371 (c)(1),
(2) Date: Jun. 18, 2015

(87) PCT Pub. No.: WO2014/097037
PCT Pub. Date: Jun. 26, 2014

(65) Prior Publication Data
US 2016/0183502 A1  Jun. 30, 2016

Related U.S. Application Data

(60) Provisional application No. 61/739,252, filed on Dec. 19, 2012.

(51) Int. Cl.
*A01K 63/00* (2017.01)
*A01K 63/06* (2006.01)
(Continued)

(52) U.S. Cl.
CPC .............. *A01K 63/06* (2013.01); *A01K 61/10* (2017.01); *F21V 23/003* (2013.01); *F21V 31/00* (2013.01);
(Continued)

(58) Field of Classification Search
CPC ...... A01K 63/06; A01K 61/00; A01K 61/007; A01K 61/17
(Continued)

(56) References Cited

U.S. PATENT DOCUMENTS 3,726,251 A * 4/1973 Fremont ................ A01K 61/00
119/215
3,741,158 A * 6/1973 Moe, Jr. ................ A01K 61/17
119/217

(Continued)

FOREIGN PATENT DOCUMENTS

CN   201696972 U   1/2011
CN   201967181 U   9/2011
(Continued)

OTHER PUBLICATIONS

Torisawa, S. et al "Schooling Behaviour of Juvenile Pacific Bluefin Tuna Thunnus Orientalis depends on their Vision Devleopment" 2011, Journal of Fish Biology. Absract Only.
(Continued)

*Primary Examiner* — Ebony E Evans
(74) *Attorney, Agent, or Firm* — Daniel J. Piotrowski (57) ABSTRACT

An illumination system and method configured for mitigating a growth dip and as a consequence enhancing the growth of aquatic animals in a volume of water is disclosed. The illumination system comprises at least one light source (110) comprising at least one light emitting diode arranged to emit light to the volume of water and at least one light driver (120) arranged to drive the at least one light source. The
(Continued)

illumination system also comprises a controller (140) that is adapted to provide control signals to the light driver to increase a light intensity level of the light emitted from the at least one light source from a first light intensity level (I1) to a second light intensity level (12) over a time period (T) of at least one day to two weeks, preferably at least two days to two weeks.

12 Claims, 5 Drawing Sheets

(51) Int. Cl.
| | |
|---|---|
| *A01K 61/10* | (2017.01) |
| *H05B 45/10* | (2020.01) |
| *H05B 47/16* | (2020.01) |
| *F21V 23/00* | (2015.01) |
| *F21V 31/00* | (2006.01) |
| *F21Y 115/10* | (2016.01) |
| *F21W 131/308* | (2006.01) |

(52) U.S. Cl.
CPC ............. *H05B 45/10* (2020.01); *H05B 47/16* (2020.01); *F21W 2131/308* (2013.01); *F21Y 2115/10* (2016.08)

(58) Field of Classification Search
USPC ...................................... 119/267; 324/762.07
See application file for complete search history.

(56) References Cited

U.S. PATENT DOCUMENTS

| | | | | | |
|---|---|---|---|---|---|
| 3,777,709 | A | * | 12/1973 | Anderson | A01K 61/00 119/217 |
| 4,379,437 | A | * | 4/1983 | Knowles | A01K 61/007 119/230 |
| 4,387,420 | A | * | 6/1983 | Singhi | G04G 15/006 307/38 |
| 4,933,920 | A | * | 6/1990 | Sternberg | G04G 3/02 368/15 |
| 5,961,831 | A | * | 10/1999 | Lee | C02F 3/302 210/614 |
| 6,380,865 | B1 | * | 4/2002 | Pederson | B60Q 1/2611 340/321 |
| 7,139,617 | B1 | * | 11/2006 | Morgan | H05B 47/155 700/17 |
| 8,350,500 | B2 | * | 1/2013 | Negley | H05B 45/20 315/309 |
| 8,568,009 | B2 | * | 10/2013 | Chiang | A01K 63/06 362/1 |
| 9,433,194 | B2 | * | 9/2016 | Grajcar | F21V 29/58 |
| 9,795,045 | B2 | * | 10/2017 | Hanke | A01K 63/07 |
| 9,955,545 | B1 | * | 4/2018 | Chang | H05B 33/0857 |
| 10,568,306 | B2 | * | 2/2020 | De Meester | A01K 29/00 |
| RE48,022 | E | * | 6/2020 | Tang | A01K 63/06 |
| 2003/0193842 | A1 | * | 10/2003 | Harrison | G04G 9/02 368/82 |
| 2004/0105261 | A1 | * | 6/2004 | Ducharme | H05B 45/20 362/231 |
| 2005/0135104 | A1 | | 6/2005 | Crabb | |
| 2006/0273741 | A1 | * | 12/2006 | Stalker, III | H05B 45/20 315/291 |
| 2007/0206375 | A1 | * | 9/2007 | Piepgras | A43B 1/0027 362/147 |
| 2008/0098960 | A1 | | 5/2008 | Ishibashi | |
| 2008/0197788 | A1 | * | 8/2008 | Conover | H05B 45/20 315/291 |
| 2009/0109675 | A1 | | 4/2009 | Navarro | |
| 2009/0190363 | A1 | * | 7/2009 | McDonnell | A01G 7/045 362/396 |
| 2010/0267126 | A1 | | 10/2010 | Jacobs | |
| 2011/0210678 | A1 | * | 9/2011 | Grajcar | H05B 33/0809 315/192 |
| 2011/0253056 | A1 | * | 10/2011 | Fredricks | A01K 63/06 119/247 |
| 2011/0273098 | A1 | * | 11/2011 | Grajcar | H05B 33/0809 315/186 |
| 2012/0098439 | A1 | * | 4/2012 | Recker | H05B 45/37 315/152 |
| 2012/0143381 | A1 | * | 6/2012 | Lawyer | A01K 63/003 700/282 |
| 2013/0152864 | A1 | * | 6/2013 | Grajcar | F21V 29/58 119/204 |
| 2013/0174792 | A1 | * | 7/2013 | Delabbio | A01K 63/06 119/200 |
| 2013/0239475 | A1 | * | 9/2013 | Crabb | A01G 7/045 47/58.1 LS |
| 2013/0273599 | A1 | * | 10/2013 | Robitaille | A01K 61/00 435/39 |
| 2014/0209035 | A1 | * | 7/2014 | Tang | A01K 1/03 119/267 |
| 2015/0136037 | A1 | * | 5/2015 | Boonekamp | A01K 61/00 119/226 |
| 2016/0183502 | A1 | * | 6/2016 | Tanase | F21V 23/003 119/267 |
| 2016/0265750 | A1 | * | 9/2016 | Miyahara | F21V 23/02 |

FOREIGN PATENT DOCUMENTS

| | | |
|---|---|---|
| CN | 102427634 A | 4/2012 |
| CN | 202349792 U | 7/2012 |
| DE | 202006001686 U1 | 7/2006 |
| DE | 202010005570 U1 | 10/2010 |
| JP | 52145190 A | 12/1977 |
| JP | 07155088 A | 6/1995 |
| JP | 2003333953 A | 11/2003 |
| JP | 2004159575 A | 6/2004 |
| JP | 2007060989 A | 3/2007 |
| JP | 2010187625 A | 9/2010 |
| JP | 2011019485 A | 2/2011 |
| WO | 2006137741 A1 | 12/2006 |
| WO | 2011019288 A2 | 2/2011 |

OTHER PUBLICATIONS

Migaud H. et al "The Effect of Spectral Composition and Light Intensity on Melatonin, Stress and Retinal Damage in Post-Smolt Atlantic Salmon, Salmo Salar", Acuaculture 2007, Absract Only.
Migaud, Herve "Using Light to Control Puberty in Farmed Fish", Cordis Technology Marketplace, 2009 Abstract Only.
Boeuf, Gilles et al "Does Light have an Influence on Fish Growth", Aquaculture, vol. 177, Jul. 1999. Abstract Only.
Vera, L.M. et al "Continuous High Light Intensity can Induce Retinal Degeneration in Atlantic Salmon, Atlantic Cod and European Sea Bass" Aquaculture, vol. 296, Nov. 2009. Abstract Only.
Amble, Stian B. "Early Induced Maturation in Cod (*Gadus morhua*) using Low Energy Light—Effect on Muscle Quality", 2007.
Bayarri, J.J. "Influence of Light Intensity, Spectrum and Orientation on Sea Bass Plasma and Ocular Melatonin", Journal of Pineal Research 2002. Abstract Only.

* cited by examiner

ILLUMINATION SYSTEM AND METHOD FOR ENHANCING GROWTH OF AQUATIC ANIMALS

CROSS-REFERENCE TO PRIOR APPLICATIONS

This application is the U.S. National Phase application under 35 U.S.C. § 371 of International Application No. PCT/IB2013/060618, filed on Dec. 4, 2013, which claims the benefit of U.S. Provisional Patent Application No. 61/739,252, filed on Dec. 19, 2012. These applications are hereby incorporated by reference herein.

FIELD OF THE INVENTION

The present invention relates to the field of illumination systems for enhancing growth of aquatic animals. In particular, the present invention relates to an illumination system configured for and a method for enhancing the growth of fish in a water cage, e.g. a sea water cage, by controlling the light emitted for illumination of the sea cage.

BACKGROUND OF THE INVENTION

Aquaculture is the marine counterpart of agriculture wherein aquatic animals are bred under controlled conditions. Aquaculture is a fastly developing area that has undergone several major changes in the past decades.

Fish can be classified in fresh water species and sea water species. There are also migratory species of fish that travel between fresh water and sea salt water. For example, salmon, striped bass and Atlantic sturgeon spawn and grow up to smoltification development in freshwater and they mature, so called on-growing phase, in saltwater. Fish require specific environmental conditions for growth and development, such as temperature, oxygen, water flow, etc. For on-growing phase of Atlantic salmon farming, optimal environmental conditions are provided in locations such as Norway, Chile, Canada and other higher latitudes locations, where light conditions are poor. In these areas, the application of artificial light in seawater farms has been found to have positive effects on the development and growth of fish. The positive effects of artificial lighting relates to prevention of sexual maturation of the fish. Recent research shows also positive effect of more artificial light on growth. Currently, most fish farms apply high intensity conventional light (e.g. metal halide lamps arranged above the sea cages) to provide the illumination.

US 2005/0135104 discloses a method and apparatus for illuminating a marine habitat for growth utilizing an illumination system containing light emitting diodes (LEDs). The light system includes a LED light source, a power supply for such a light source and a controller for controlling the activation status and the intensity of the LED light source. The controller allows a user or manufacturer to program the lighting period and pattern, the spectral content or the spatial content of the emitted light.

Typically for atlantic salmon, juveniles experience no/little light while in alevin stage, continuous 24 hours low lighting regime for a certain period of time, than a photoperiodic regime over a period of 6-8 weeks in order to induce smoltification, during which the fish are exposed to alternating periods of darkness and light of low intensity within 24 hours. After the period of 6-8 weeks, the fish are moved in a transfer tank wherein the fish is kept continuously under artificial low light level to complete smoltification and prepare for sea transfer. The last step in this process is moving the fish to a sea cage for further growth. A sea cage is a closed salt water area for growing fish.

It has been found that after transfer to the sea cage, the transferred fish experience a growth dip. The dip in the growth rate may last for no less than 8 weeks and up to 12 weeks, thereby seriously affecting the size of the fish after a particular period or affecting the duration of the period before fish have a predetermined size.

There is a need in the art to enhance the growth of fish, particularly in the period immediately after switching on the artificial light, e.g. after having transferred the fish to a sea cage.

SUMMARY OF THE INVENTION

In view of the above it is desirable to provide an effective artificial lighting solution or an illumination system which is able to prevent a growth dip and determine improved growth of fish (particularly salmon) that have been transferred to a water cage, e.g. a sea cage.

To that end, an illumination system configured for enhancing the growth of aquatic animals in a volume of (sea) water is disclosed. The illumination system comprises at least one light source comprising at least one light emitting diode arranged to emit light to the volume of water and at least one light driver arranged to drive the at least one light source. The illumination system also comprises a controller that is adapted to provide control signals to the light driver to increase a light intensity level of the light emitted from the at least one light source from a first light intensity level to a second light intensity level over a time period of at least one day to two weeks, preferably at least two days to two weeks.

Moreover, a method for accelerating growth of aquatic animals in a volume of water is disclosed. The method uses an illumination system comprising at least one light source having at least one light emitting diode. The method comprises the step of providing control signals to drive the at least one light source to emit light to the volume of water to increase a light intensity level of the light from a first light intensity level to a second light intensity level over a time period of at least one day to two weeks, preferably at least two days to two weeks.

A water cage, e.g. a sea cage, containing the illumination system is also disclosed.

The illumination system and method for enhancing the growth of the aquatic animals is based on the insight that the high light intensity that animals experience at the start of artificial lighting application contributes to the observed dip in the growth rate. This has been clearly observed for fish transferred to sea water, during the first weeks after the artificial light has been switched on. The disclosed illumination system and method provide for a light intensity pattern and time pattern wherein the light intensity is slowly increased from a low intensity level (which may be zero) of the artificial light to a considerably higher intensity level (which may correspond to the high intensity value as directly applied in prior art sea cage lighting systems) over a prolonged period of time. As a result, the animals are not blinded by high intensity light and the eyes of the animals can slowly adapt to higher light intensities. In comparison the prior art metal halide lighting systems switch on at once and "blind" the fish preventing it from eating properly. A result of the disclosed illumination system and method is that the fish are not blinded, have better visibility for the food and therefore the growth dip can be mitigated.

Another effect that fish experience from switching on metal halide lamps is stress that results in lower food conversion which also translates to lower growth. By actively controlling the light intensity, which is possible also as a result of using light emitting diodes having good illumination control properties, the animal growth can be better controlled and hence the animals can be harvested earlier or the animals can grow bigger.

Preferably, the first light intensity level is such that sexual maturation of the fish is prevented. The applicable light intensity levels depend on the species as for example, cod fish is more sensitive to light than salmon.

Typically, the light intensity is increased over a period of at least one day to two weeks, depending also on factors such as the fish species and the development stage of the animals, water temperature etc. Preferably, the period over which the light intensity is increased lasts between two days and two weeks, e.g. three days, four days, five days, six days or seven days.

In an embodiment of the illumination system, the controller is adapted to provide control signals to the light driver such that the light intensity level is increased continuously from the first light intensity level to the second light intensity level over the prolonged time period. An advantage of a continuous increase of the light intensity is that the second light intensity level can be reached within a reasonable period of time, thereby reducing the risk of fish maturation. In an alternative embodiment of the illumination system, the controller is adapted to provide control signals to the light driver such that the light intensity level is increased step-wise from the first light intensity level to the second light intensity level over the prolonged time period.

In an embodiment of the illumination system, the controller is adapted to provide control signals to the light driver such that the light intensity level is increased step-wise from the first light intensity level to the second light intensity level over the time period, wherein the control signals during the time period also provide one or more time subperiods during which the light intensity level is decreased. An advantage of the embodiment is that the fish can rest during periods of decreased light intensity. The level to which the light intensity is reduced should preferably stay above the light level below which maturation occurs. Preferably, the duration of the subperiods during which the lower light intensity is applied is decreased over the time period in order to eventually let the fish get used to continuous high light intensities for 24 hours a day.

In an embodiment of the illumination system, the controller is adapted to provide control signals to the light driver such that the light intensity level is increased at a first rate during a first subperiod of the time period and at a second rate during a second subperiod of the time period, wherein the first rate is lower than the second rate. The advantage of this embodiment is that a lower first rate can be applied in a first subperiod early on in the time period and after the eye sensitivity level of the fish is reached, the second (higher) rate can be applied during the second subperiod. The first and second subperiods may be consecutive periods.

In an embodiment of the illumination system, the illumination system comprises an input device to receive values of at least one of the first light intensity level, the second light intensity level and the time period. These values may be set depending on factors such as species of the animals, development stage and other factors. The values may be preset by the manufacturer or be set by a user, e.g. the operator of the fish hatchery.

In an embodiment of the illumination system, the first light intensity level is at least a factor 10-100 smaller than the second light intensity level. The controller and the light sources are therefore adapted to begin illumination at a very low intensity and to increase the light intensity considerably afterwards over the prolonged period of time to finally obtain the second light intensity level. As an example, the first light intensity level is only one percent or a few percent of the second light intensity level.

In an embodiment of the illumination system, the at least one light source is submersible or submersed in the water. In an embodiment, the illumination system comprises a plurality of light sources, preferably (sets of) light emitting diodes, submersible or submersed in the water of the sea cage over a depth in the range of 1-20 meters. Conventionally, feeding the fish in sea cages creates the situation that food is provided from above the water and fish eat mainly close to the water surface. Therefore, a stressful situation arises due to the high density of fish around the "feeding spots" close to the water surface and due to the high light intensity. By submersing the light source(s) into the water, not all fish are attracted to the water surface during feeding cycles. Instead, the fish may stay at larger depths where the food is also visible as a result of the artificial light from the submersed light sources, thereby causing less stress for the fish as a result of the lower density of fish near the water surface. The reduction of the stress level contributes to the enhanced growth of the fish. It is noted that the invention relates to all possible combinations of features recited in the claims. Thus, all features and advantages of the first aspect likewise apply to the second and third aspects, respectively.

BRIEF DESCRIPTION OF THE DRAWINGS

The various aspects of the invention, including its particular features and advantages, will be readily understood from the following detailed description and the accompanying drawings, in which.

DETAILED DESCRIPTION

The present invention will now be described more fully hereinafter with reference to the accompanying drawings, in which currently preferred embodiments of the invention are shown. The present invention may, however, be embodied in many different forms and should not be construed as limited to the embodiments set forth herein; rather, these embodiments are provided for thoroughness and completeness, and to fully convey the scope of the invention to the skilled addressee. Like reference characters refer to like elements throughout the description.

Figure 1:
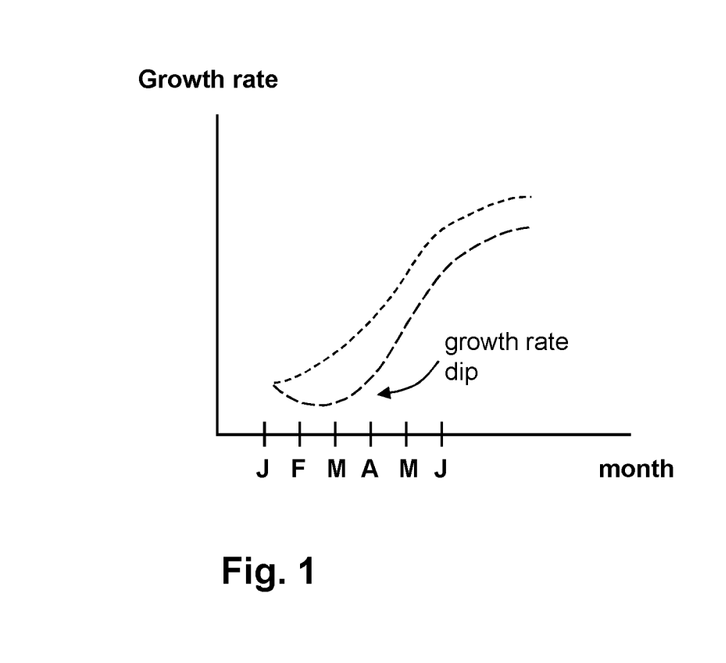
FIG. 1 is a schematic graph of the growth rate of the fish after transfer to a sea cage.

FIG. 1 is a schematic illustration of a dip experienced in the growth rate of fish when transferred from a fresh water tank to a sea cage. Fish transferred to the sea cage in December or January show a decreased growth rate for the first few weeks, possibly extending until March or even the beginning of April. The other graph illustrates the expected effect of the invention, wherein light intensity is slowly increased over a prolonged period of time and the growth rate dip disappears or at least is mitigated.

Figure 2:
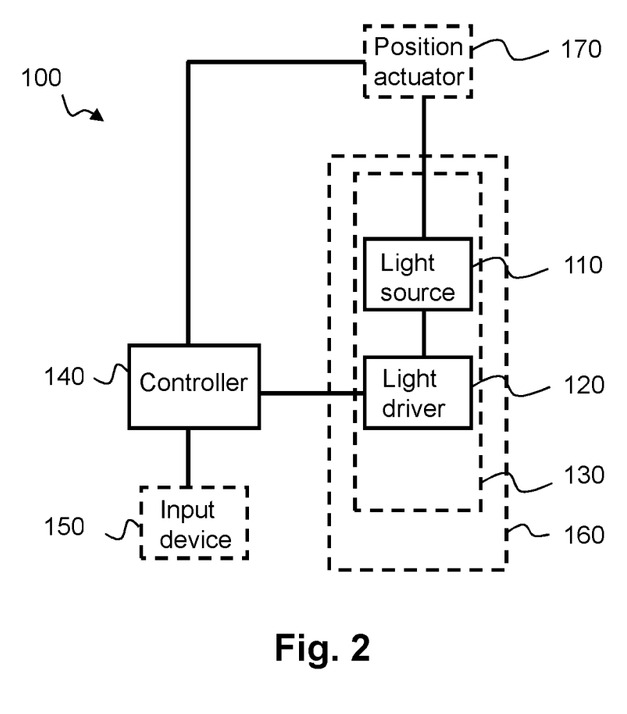
FIG. 2 illustrates an illumination system according to an embodiment of the present invention.
Figure 3:
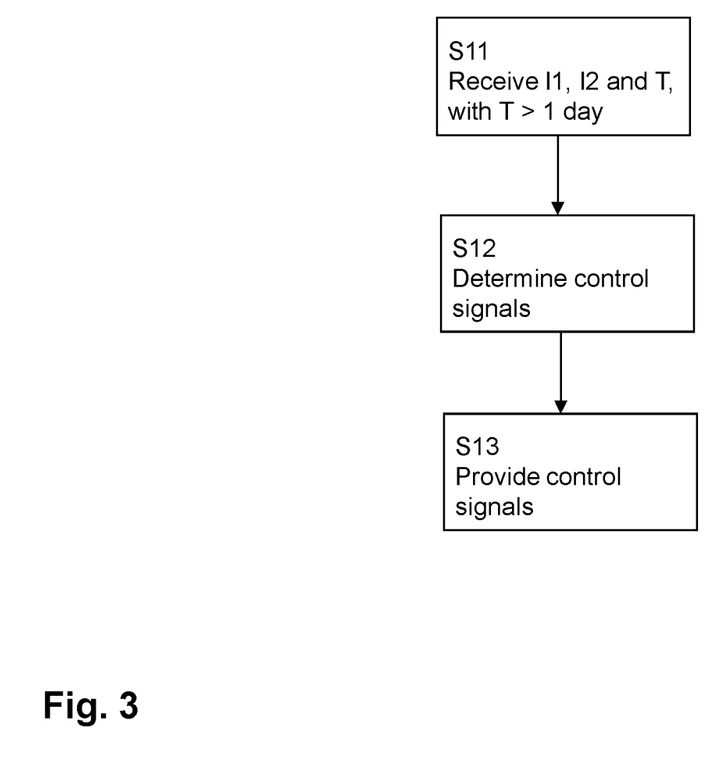
FIG. 3 is a schematic illustration of a method according to an embodiment of the invention.

FIG. 2 is a schematic view of an illumination system 100. FIG. 3 shows the steps of a method to operate the illumination system 100.

The illumination system 100 comprises a light source 110. The light source 110 comprises at least one light emitting diode. The light source 110 is thereby arranged to emit light. The light source 110 is preferably arranged to be immersible in a body of water. The illumination system 100 also comprises a light driver 120 which is operatively coupled to and arranged to drive the light source 110. The light driver 120 can be an LED driver. The light driver 120 may optionally be integrated with the light source 110, in a lighting device 130.

The illumination system 100 further comprises a controller 140 which is adapted to provide control signals to the light driver to increase a light intensity level of the light emitted from the at least one light source from a first light intensity level to a second light intensity level over a time period of at least one day to two weeks, preferably at least two days to two weeks as will be explained in more detail with reference to FIGS. 5A-5D.

Optionally, the controller 140 may be operatively connected to an input device 150. The input device 150 is configured to receive values of at least one of the first light intensity level I1, the second light intensity level I2 and the time period T, with T>1 day, for increasing the illumination intensity from the first intensity level to the second intensity level, as part of step S11 in FIG. 3. These values may be set depending on factors such as species of the animals, development stage and other factors. The values may be preset by the manufacturer or be set by a user, e.g. the operator of the fish hatchery.

The control signals from the controller 140 are determined, based on the received first light intensity level I1, the second light intensity level I2 and the time period T for increasing the illumination intensity from the first intensity level I1 to the second intensity level I2, by the controller 140 in a step S12, followed by a step S13 where the determined control signals are provided to the at least one light driver 120. The at least one light driver 120 thereby drives the at least one light source 110 to emit light to the volume of water.

The illumination system 100 in FIG. 2 may optionally comprise at least one housing 160 comprising at least one of the at least one light source 110. The housing 160 may be arranged to be immersible in the volume of water. The housing 160 may optionally comprise the light driver 120.

The illumination system 100 may further comprise at least one position actuator 170. The position actuator 170 is arranged to adjust the depth of immersion of the at least one light source 110 in the volume of water. The depth of immersion is associated with a vertical distance between a surface of the volume of water and the at least one light source 110. The controller 140 may further be adapted to receive a desired position setpoint for the at least one light source 110. The illumination system 100 may also be arranged above the surface of the volume of water for illumination of the body of water by slowly increasing the light intensity over the prolonged period of time.

Figure 4:
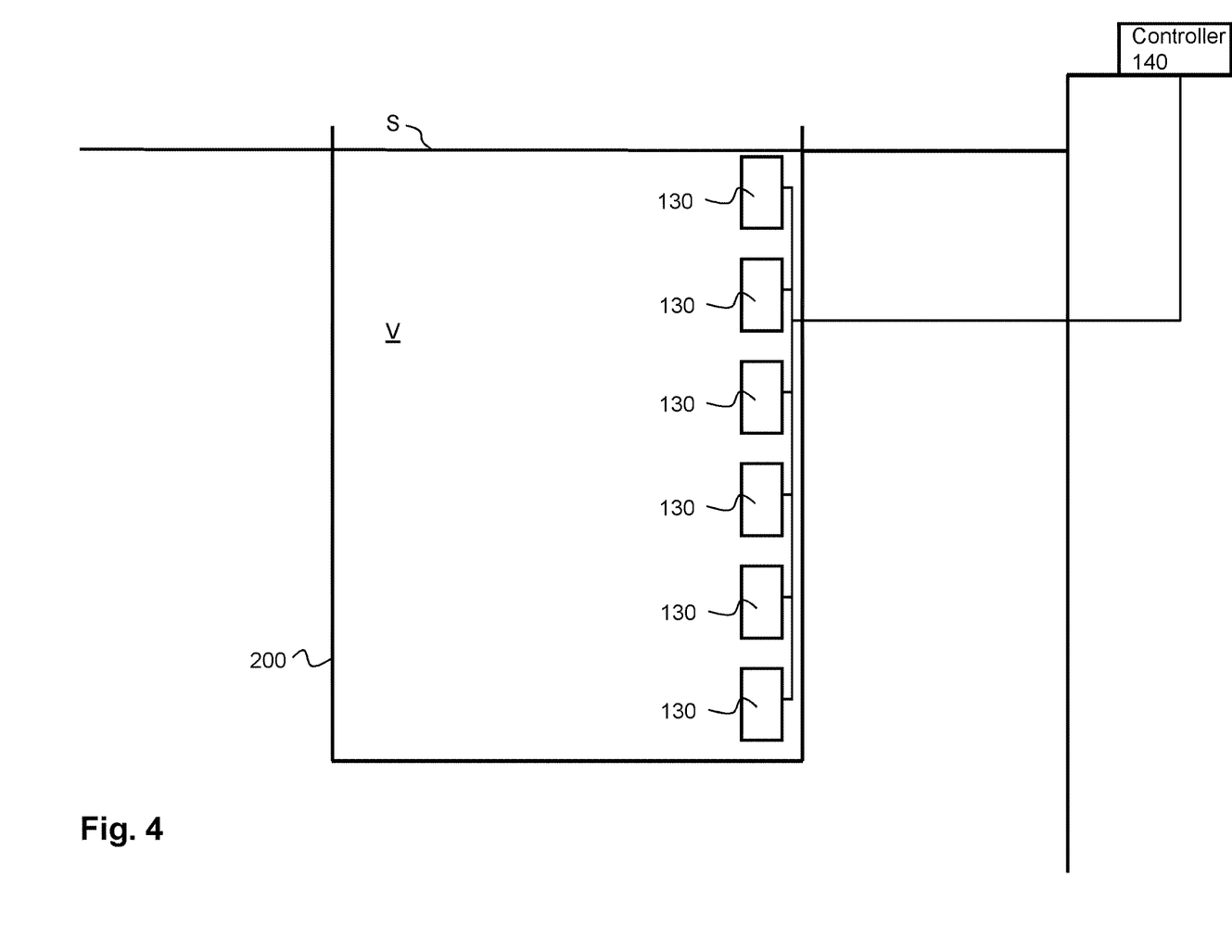
FIG. 4 is a schematic illustration of a sea cage comprising an illumination system according to an embodiment of the invention.

FIG. 4 is a schematic illustration of a sea cage 200 containing a plurality of lighting devices 130 (i.e. integrated devices comprising light sources 110 and light drivers 120) operatively coupled to a controller 140. The light sources 110 may comprise LED luminaires each containing a plurality of LEDs, e.g. 160 LEDs. The lighting devices 130 are provided over a depth of 20 meters below the surface S of the volume of sea water V.

The lighting devices 130 may be configured as 400-1000 W electrical power per LED luminaire for peak light intensity. The lighting devices 130 are dimmable to be able to provide the first light intensity I1 by the control signals from the controller 140.

By submersing the lighting devices 130 into the water, not all fish are attracted to the water surface S during feeding cycles. Instead, the fish may stay at larger depths where the food is also visible as a result of the artificial light from the submersed lighting devices 130, thereby causing less stress for the fish as a result of the lower density of fish near the water surface S during feeding. The reduction of the stress level contributes to the enhanced growth of the fish. The sea cage 200 may comprise a food dispensing system (not shown in FIG. 4).

The applied light intensities I1 and I2 and the duration of the time period T may be dependent on many factors. Specific knowledge of cultured fish species and their different development stages may be used together with corresponding data on light intensity levels and photoperiods in order to optimize the environmental conditions for different species of fish.

Figure 5A:
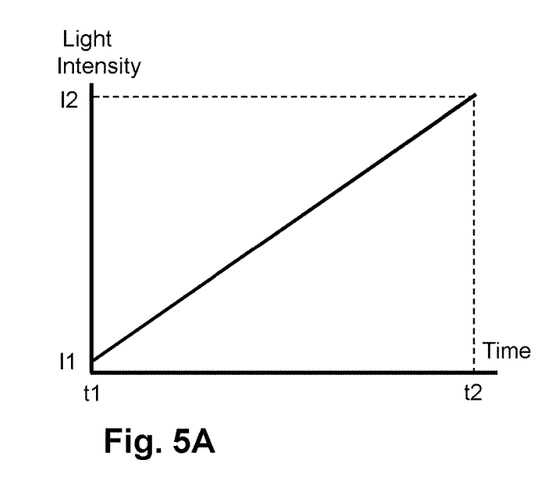
FIGS. 5A-5E are illustrations of light intensity vs. time pattern according to embodiments of the invention.

FIGS. 5A-5D are schematic illustrations of light intensity vs. time characteristics for the controller 140 to enhance the growth of aquatic animals. In FIG. 5A, the controller 140 controls the light source(s) 110 to start emitting light into the volume V of water at light intensity I1 at time t1. The light intensity is continuously increased to a target light intensity level I2 at time t2. The time period T=t2−t1 is in the range of one day to two weeks, e.g. two days, three days, four days, five days, six days or seven days. Light intensity level I1 may correspond to artificial light of e.g. a radiometric flux density of 0.016 W/m2 which prevents sexual maturation of salmon. It should be appreciated that, while in FIG. 5A, the characteristic is linear from I1 to I2, other functions may be applied, e.g. an exponential characteristic.

Figure 5B:
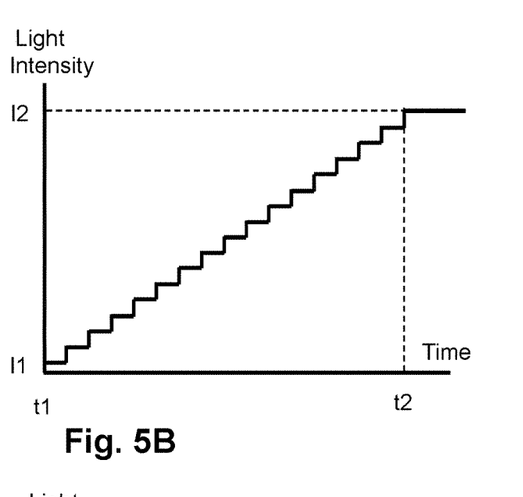

FIG. 5B provides an illustration wherein the light intensity from the light source(s) 110 is increased step-wise from a first light intensity level I1 to a second light intensity level I2. Preferably, the first step yields a light intensity value of at least a radiometric flux density of 0.016 W/m2, which is the light intensity threshold below which sexual maturation occurs. As can be observed from FIG. 5B, the light intensity I2 is maintained after time t2.

Figure 5C:
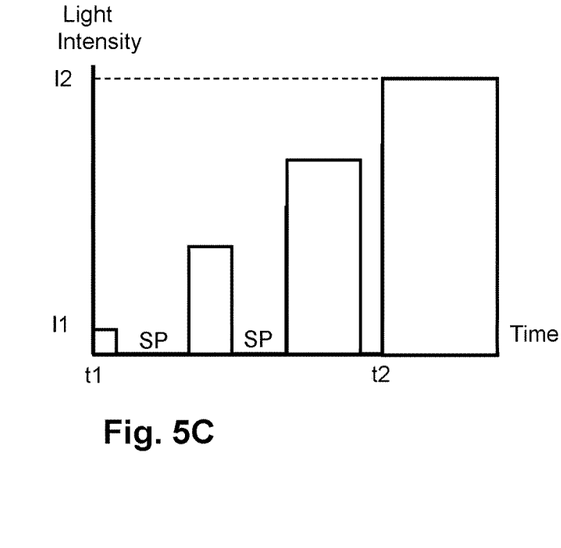
Figure 5D:
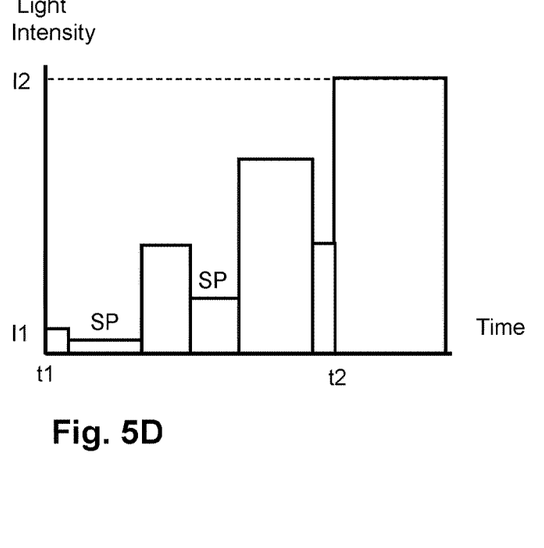

In FIGS. 5C and 5D, the controller 140 provides control signals to the light driver 120 such that the light intensity level of the light source(s) 110 is increased step-wise from the first light intensity level I1 to the second light intensity level I2 over the time period T=t2−t1, During one or more time subperiods SP within time period T, controller 140 may provide control signals to the lighting devices 130 such that the light intensity level is decreased, e.g. to zero illumination (FIG. 5C) or to a lower finite intensity (FIG. 5D). An advantage of the embodiment is that the fish can rest during periods of decreased light intensity. The level to which the light intensity is reduced should preferably stay above the light level below which maturation occurs.

In FIGS. 5C and 5D, the duration of the subperiods SP during which the lower light intensity is applied is decreased over the time period in order to eventually let the fish get used to continuous high light intensities for 24 hours a day to prevent early maturation.

It should be appreciated that many further light intensity vs. time schemes can be envisaged for increasing the growth rate of aquatic animals, more particularly fish, within the scope of the present invention.

Figure 5E:
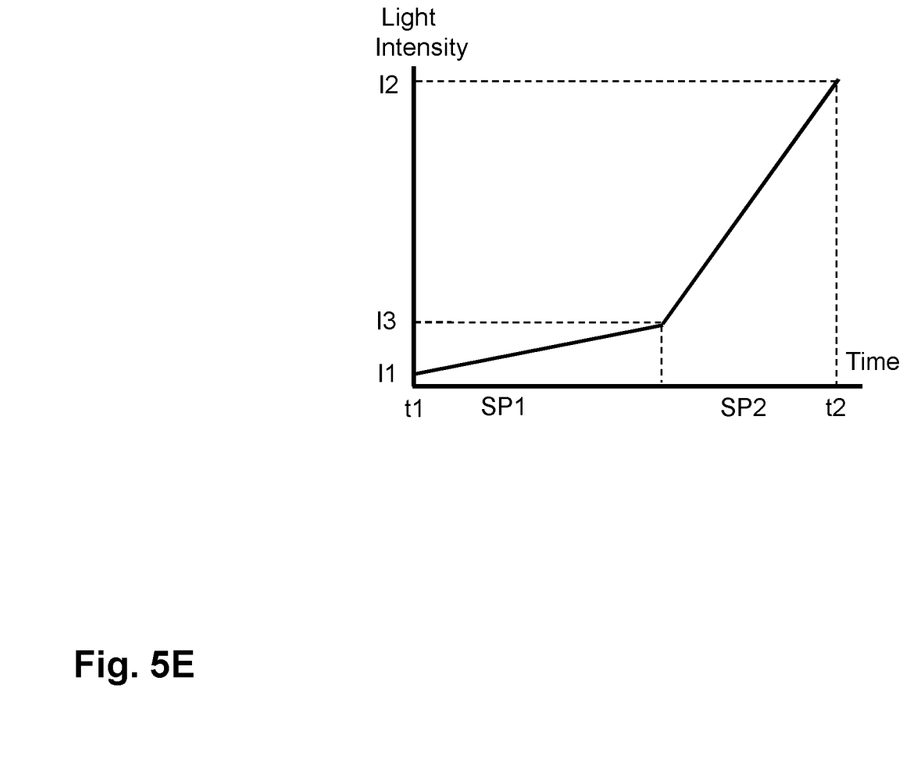

As an example, FIG. 5E is a schematic illustration wherein the light intensity level is first increased slowly for the first light intensity level I1 to a higher light intensity level I3 during a first subperiod SP1. The light intensity level I3 may relate e.g. to the eye sensitivity threshold of the fish. During a second subperiod SP2, the intensity level may then be increased at a higher rate to the final level I2. It should be appreciated that the first and second rate do not need to be linear. For example, the increase from light intensity level I3 to light intensity level I2 may be exponential.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored.

The invention claimed is:

1. An illumination system configured for enhancing the growth of aquatic animals in a volume of water comprising:
    at least one light source comprising a plurality of light emitting diodes arranged to emit light to the volume of water, wherein each of said light emitting diodes are configured to be submersed into the volume of water at a depth ranging from 1-20 meters,
    at least one light driver arranged to drive the at least one light source,
    a controller, wherein the controller in use provides control signals to the light driver to increase a light intensity level of the light emitted from the at least one light source from a first light intensity level to a second light intensity level over a time period of at least three 24-hour days to fourteen 24-hour days,
    wherein the first light intensity level is in the range of $1/10$ to $1/100$ of the second light intensity level; and wherein over the time period, the first light intensity level remains less than the second light intensity level until the last day of the time period.

2. The illumination system according to claim 1, wherein the controller, in use, provides control signals to the light driver such that the light intensity level is increased step-wise from the first light intensity level to the second light intensity level over the time period, wherein the control signals during the time period also provide one or more time subperiods during which the light intensity level is decreased; and,
    wherein each time subperiod has a duration.

3. The illumination system according to claim 2, wherein the controller, in use, sets the duration of the time subperiods to decrease during the time period.

4. The illumination system according to claim 1, wherein the controller, in use, provides control signals to the light driver such that the light intensity level is increased at a first rate of light intensity change per unit time during a first subperiod of the time period and at a second rate of light intensity change per unit time during a second subperiod of the time period, wherein the first rate is lower than the second rate.

5. An illumination system configured for enhancing the growth of aquatic animals in a volume of water comprising:
    at least one light source comprising a plurality of light emitting diodes arranged to emit light to the volume of water, wherein each of said light emitting diodes are configured to be submersed into the volume of water at a depth ranging from 1-20 meters,
    at least one light driver arranged to drive the at least one light source,
    a controller, wherein the controller, in use, provides control signals to the light driver to increase a light intensity level of the light emitted from the at least one light source from a first light intensity level to a second light intensity level over a time period of at least three 24-hour days to fourteen 24-hour days,
    wherein the first light intensity level is in the range of $1/10$ to $1/100$ of the second light intensity level, and
    wherein the controller, in use, provides control signals to the light driver such that the light intensity level is increased continuously or step-wise from the first light intensity level to the second light intensity level, such that over the time period the light intensity never decreases.

6. The method for accelerating growth of aquatic animals using an illumination system according to claim 5, wherein the illumination system is associated with a sea cage, comprising the steps of:
    transferring the aquatic animals from a water tank to a sea cage; and
    controlling the light from the illumination system.

7. The illumination system according to claim 5, wherein at least one additional light source is arranged above the volume of water.

8. A method for accelerating growth of aquatic animals in a volume of water by an illumination system, the illumination system comprising at least one light source having at least one light emitting diode, the method comprising the step of providing control signals to drive the at least one light source to emit light for the volume of water to increase a light intensity level of the light from a first light intensity level to a second light intensity level over a time period of at least three 24-hour days to fourteen 24-hour days, wherein the first light intensity level is in the range of $1/10$ to $1/100$ of the second light intensity level; and,
    further comprising the step of providing control signals such that the light intensity level is increased continuously or step-wise from the first light intensity level to the second light intensity level, such that over the time period the light intensity never decreases.

9. The method according to claim 8, wherein at least one of the first light intensity level, the second light level or the time period are set depending on at least one of the species of aquatic animals and the development stage of the aquatic animals.

10. The method according to claim 8, comprising the step of locating at least one additional light source above the volume of water.

11. The method according to claim 8 wherein the step of providing control signals further comprises controlling the light intensity level such that the light intensity level is increased at a first rate of light intensity change per unit time during a first subperiod of the time period and at a second rate of light intensity change per unit time during a second subperiod of the time period, wherein the first rate is lower than the second rate.

12. A water cage comprising the illumination system according to claim 5.

* * * * *